Figure 1:
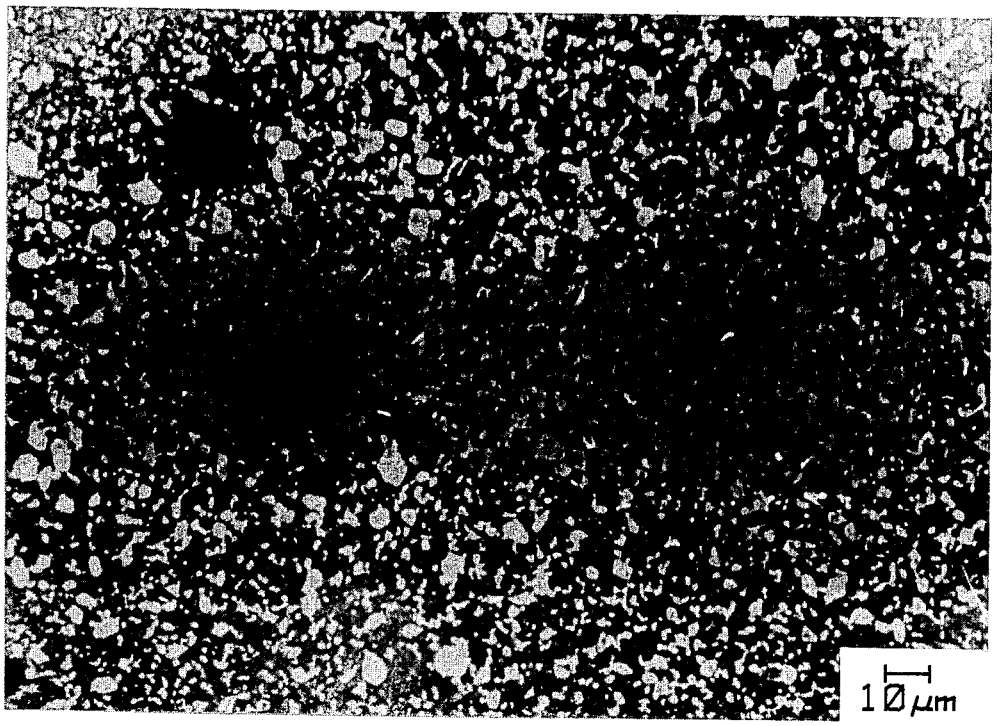

United States Patent [19]

Hodge

[11] Patent Number: 4,576,919

[45] Date of Patent: Mar. 18, 1986

[54] ZIRCON-CORDIERITE COMPOSITE CERAMIC

[75] Inventor: James D. Hodge, Cohoes, N.Y.

[73] Assignee: General Electric Company, Schenectady, N.Y.

[21] Appl. No.: 667,702

[22] Filed: Nov. 2, 1984

[51] Int. Cl.[4] ............... C03C 10/08; C04B 35/48
[52] U.S. Cl. ............................... 501/9; 501/32; 501/105; 501/106; 501/107; 501/119; 501/153; 264/65
[58] Field of Search ............ 501/106, 107, 9, 32, 501/119, 104, 105; 264/65

[56] References Cited

U.S. PATENT DOCUMENTS

| | | | |
|---|---|---|---|
| 2,684,912 | 6/1954 | Dreher | 501/107 |
| 4,292,083 | 9/1981 | Rauch, Sr. | 501/104 |
| 4,364,760 | 12/1982 | Higuchi et al. | 55/523 |
| 4,495,300 | 1/1985 | Sano | 501/104 |
| 4,528,275 | 7/1985 | Hodge | 501/9 OR |

OTHER PUBLICATIONS

A. G. Gregory & T. J. Veasey, "Review: The Crystallization of Cordierite Glass", Journal of Materials Science 6 (1971), pp. 1312-1321.
B. H. Mussler & M. W. Shafer, "Preparation and Properties of Mullite-Cordierite Composites", Ceramic Bulletin, vol. 63, No. 5, pp. 705-710 (1984).
Thermal-Expansion Stresses in Reinforced Plastics, Journal of Research of the N.B.S., RP1745, vol. 37, pp. 239, 11-46 by Turner.

Primary Examiner—William R. Dixon, Jr.
Assistant Examiner—Karl Group
Attorney, Agent, or Firm—Jane M. Binkowski; James C. Davis, Jr.; James Magee, Jr.

[57] ABSTRACT

Method for producing a polycrystalline body comprised of from about 50% by weight to about 95% by weight of zircon and from about 5% by weight to about 50% by weight of cordierite, said body having a density greater than 85% of its theoretical density.

25 Claims, 2 Drawing Figures

ZIRCON-CORDIERITE COMPOSITE CERAMIC

The present invention relates to the production of a polycrystalline body, i.e. a composite ceramic, comprised of a zircon phase and a cordierite phase. In a preferred embodiment, the present invention relates to the production of a polycrystalline material comprised of zircon and cordierite useful as a substrate for silicon with a thermal expansion coefficient identical or close to that of silicon.

To minimize stress at the silicon-substrate interface of an IC device during operation, it is desired that the substrate material have a thermal expansion coefficient which matches that of silicon as closely as possible. Such a match is expected to be especially critical in projected high power semiconductor devices where heating and cooling cycles during operation of the device are expected to subject the silicon-substrate interface to more severe thermal stresses than are encountered in present devices. Present technology utilizes alpha alumina as the substrate material. However, the thermal expansion mismatch between alumina and silicon is judged to be too great for this material to be satisfactory for future applications.

Zircon is a crystalline zirconium silicate phase which has the approximate chemical formula, $ZrSiO_4$ or $ZrO_2.SiO_2$. It is a potential substrate material as its thermal expansion coefficient is relatively low, i.e. $4.2 \times 10^{-6}/°$ K. at 300° K. However, this value is too high for zircon to be considered as a material to match the thermal expansion coefficient of silicon ($2.5 \times 10^{-6}/°$ K. at 300° K.). Therefore, according to one aspect of the present invention, the thermal expansion coefficient of zircon is lowered to match that of silicon through the addition of a second phase having a low thermal expansion coefficient. Specifically, in accordance with the present invention, cordierite (a magnesium aluminum silicate) is added. Cordierite has a thermal expansion coefficient of $-0.5 \times 10^{-6}/°$ K. at 300° K.

Figure 2:
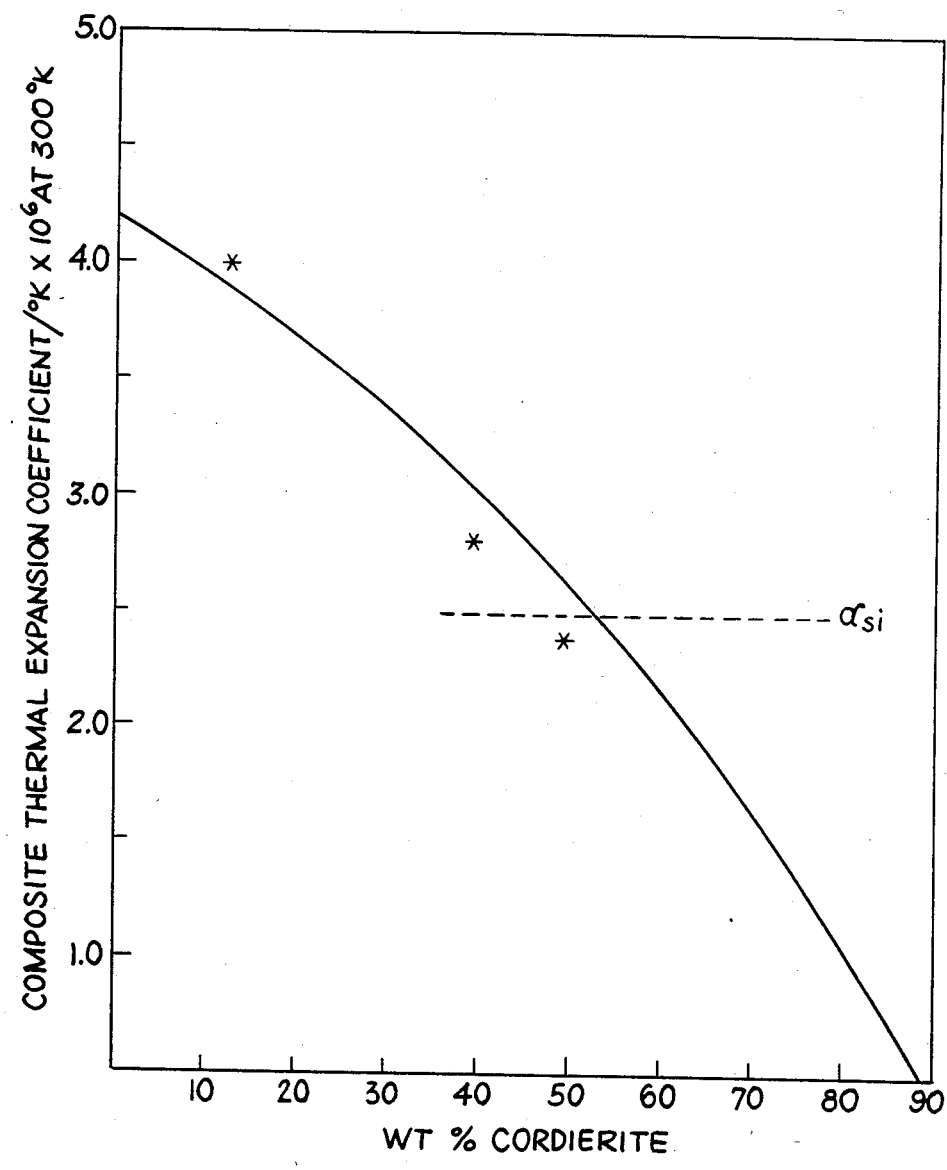

Those skilled in the art will gain a further and better understanding of the present invention from the detailed description set forth below, considered in conjunction with the figures accompanying and forming a part of the specification, in which:

FIG. 1 is a photomicrograph (magnified 750X) showing the polished cross-section of a composite ceramic produced in accordance with the present invention comprised of about 51.3% by weight of zircon phase (lighter phase), about 45.5% by weight of cordierite (darker colored phase) and about 3.3% by weight of a $TiO_2$ phase (brighter colored particles); and FIG. 2 illustrates a graph showing the calculated thermal expansion coefficient of the present polycrystalline body as a function of its cordierite content. Specifically, in FIG. 2, using the formula for the thermal expansion coefficient for a multiphase body originally derived by Turner, J. Res. NBS, 37, 239 (1946), the thermal expansion coefficient of a zircon-cordierite ceramic was calculated at 300° K. FIG. 2 is a graph showing the results of such calculations compared with the thermal expansion coefficient of silicon at 300° K. shown as $\alpha_{Si}$. The calculated graph in FIG. 2 indicates that for a zircon-cordierite composite ceramic to match the thermal expansion of silicon, it would need to have a content of about 53 wt % cordierite. The asterisks in FIG. 2 are measured thermal expansion coefficients of the present composites of Examples 1, 9 and 10 herein which contained $TiO_2$ phase in amounts ranging from about 0.9% by weight to about 3.7% by Weight but are plotted according to their cordierite content. The measured points of FIG. 2 indicate that the calculated graph gives only a rough estimate of the thermal expansion coefficient of the present composite and shows that such estimate is generally within about 15% of the actual thermal expansion coefficient of the composite. It was determined empirically that the proper amount of cordierite needed for the present composite to match the thermal expansion coefficient of silicon was about 47% by weight of the composite. Also, it was determined mathematically that the $TiO_2$ phase ranging up to about 5% by weight of the sintered body has no measurable or significant effect on the thermal expansion coefficient of the body.

In accordance with the present invention, a zircon-cordierite ceramic can be fabricated to match the thermal expansion coefficient of silicon.

Briefly stated, the present process for producing a polycrystalline body comprised of from about 45% by weight to about 95% by weight of polycrystalline zircon phase and from about 5% by weight to about 55% by weight of polycrystalline cordierite phase comprises providing a mixture comprised of zircon and/or $ZrO_2$, $Al_2O_3$, MgO and $SiO_2$ and a nucleating agent, said zircon and/or $ZrO_2$, $Al_2O_3$, MgO and $SiO_2$ being used in amounts required to produce said polycrystalline body, shaping said mixture into a compact, sintering said compact at a temperature ranging from about 1290° C. to about 1550° C. at which sufficient liquid phase is generated to liquid phase sinter the compact and produce a densified body having a density greater than about 85% of the theoretical density of said body, said sintering temperature having no significant deleterious effect on said body, said sintered body containing said zircon phase and a glassy phase of said cordierite, nucleation-annealing said sintered body at a temperature ranging from about 600° C. to about 800° C. to nucleate said glassy cordierite phase, crystallization-annealing the resulting nucleated body at a temperature ranging from about 1200° C. to below the temperature at which liquid forms in said body to produce said polycrystalline body, said nucleating agent being an agent for nucleating said glassy cordierite phase, said nucleating agent being used in an amount sufficient to nucleate said glassy cordierite phase to produce said polycrystalline body, said sintering, said nucleation-annealing and said crystallization-annealing being carried out in an atmosphere or vacuum which has no significant deleterious effect on said compact or body.

In the present invention, the zircon phase exists in thermodynamic equilibrium with a cordierite phase. The composition of the cordierite phase is one which can exist in thermodynamic equilibrium with the zircon phase. The present polycrystalline body, therefore, is comprised of a polycrystalline zircon phase composed of about 67.2 weight % $ZrO_2$ balance $SiO_2$, and a polycrystalline cordierite phase comprised of a magnesium aluminum silicate with the formula of or about $2MgO.2Al_2O_3.5SiO_2$, i.e., from about 13.7 weight % to about 16.5 weight % MgO, from about 28.4 weight % to about 34.9 weight % $Al_2O_3$ and from about 51.4 weight % to about 55.2 weight % $SiO_2$.

In the present invention, the phase composition of the present polycrystalline body depends largely on its final application. In one embodiment of the present invention, the phase composition of the present polycrystalline body is tailored to match the thermal expansion coefficient of silicon at 300° K.

In carrying out the present process, a uniform or at least a substantially uniform particulate mixture or dispersion of the ingredients or components, i.e. $ZrSiO_4$ and/or $ZrO_2$, $Al_2O_3$, MgO, $SiO_2$ and nucleating agent, is formed. The particular amount of $ZrSiO_4$ and/or $ZrO_2$, $Al_2O_3$, MgO and $SiO_2$ used in forming the mixture is determined by the particular phase composition desired in the polycrystalline body. In the present process, there is no significant loss of the components, i.e. $ZrSiO_4$ and/or $ZrO_2$, $Al_2O_3$, MgO and $SiO_2$, forming the zircon and cordierite phases in the present polycrystalline body.

The present nucleating agent is one which nucleates the glassy cordierite phase in the present process and has no significant deleterious effect on the body. Representative of such a nucleating agent is titanium dioxide, titanium isopropoxide, lithium fluoride, magnesium fluoride and mixtures thereof. Titanium isopropoxide thermally decomposes below the present sintering temperature to titanium dioxide and by-product gas which vaporizes away.

The particular amount of nucleating agent used is determinable empirically and depends largely on the amount of glassy cordierite phase present. The nucleating agent must be present in at least an amount which nucleates the glassy cordierite phase sufficiently to allow its crystallization to produce the present polycrystalline body. Generally, in the present process, the nucleating agent is used in an amount ranging from about 4.5% by weight to about 10% by weight, preferably from about 6% by weight to about 8% by weight, and more preferably about 7.5% by weight, of the total weight of the glassy cordierite phase in the body. An amount of nucleating agent less than about 4.5% by weight may not be enough to be operable whereas an amount in excess of about 10% by weight may effect the properties of the final product, i.e. particularly its thermal and electrical properties. Specifically, the nucleating agent should not be used in an amount which has a significantly deleterious effect on the present polycrystalline body.

The components of the mixture can be of commercial or technical grade. Specifically, they should not contain any impurities which would have a significantly deleterious effect on the properties of the resulting polycrystalline body. The larger the amount of impurities in the starting materials, the greater is the amount of glassy phase in the final product.

The present mixture of components or ingredients can be formed by a number of conventional techniques such as, for example, ball milling or jet milling. Representative of the mixing techniques is ball milling preferably with balls of a material such as $\alpha$-$Al_2O_3$ which has low wear and which has no significant detrimental effect on the properties desired in the final product. Preferably, milling is carried out in a liquid mixing medium which is inert to the ingredients. Typical liquid mixing mediums include hydrocarbons such as benzene and chlorinated hydrocarbons. The resulting wet milled material can be dried by a number of conventional techniques to remove the liquid medium. Preferably, it is dried in an oven maintained just below the boiling point of the liquid mixing medium.

The present particulate mixture should have a particle size which produces the present polycrystalline body. Preferably, the present mixture has an average particle size which is submicron. Larger particle sizes, generally greater than about 5 microns, have a tendency to lower densification. In the present mixture, components other than zircon powder should be of a size which allows the present reaction to take place, i.e. formation of zircon and cordierite phases.

A number of techniques can be used to shape the particulate mixture into a compact. For example, the mixture can be extruded, injection molded, die-pressed, isostatically pressed, slip cast or tape cast to produce the compact of desired shape. Any lubricants, binders or similar material used in shaping the mixture should have no significant deteriorating effect on the compact or the resulting polycrystalline body. Such materials are of the type which evaporate away on heating at temperatures below the present sintering temperature, and preferably below 200° C., leaving no significant residue or any effective contaminants.

The shaped compact can be in any desired form. For example, it can be simple, hollow and/or complex in shape. Preferably, for use as a substrate, it is in the form of a tape.

The compact is sintered at a temperature at which sufficient liquid phase is generated to carry out the present liquid phase sintering and such sintering temperature can range from about 1290° C. to about 1550° C. The sintering temperature should have no significantly deleterious effect on the compact or body, i.e., the sintering temperature should not generate so much liquid phase as to slump the compact or body. Specifically, the particular sintering temperature used depends largely on the amount of liquid phase generated at such temperature for the particular composition of the compact. For the present composition, where the nucleating agent has no effect on sintering temperature, the sintering temperature is one at which the glassy cordierite is molten, and in such instance it ranges from higher than about 1465° C. to about 1550° C. Temperatures higher than about 1550° C. are not operable because they generate so much liquid phase as to slump the compact or body. With increasing temperatures, increasing amounts of zircon dissolve in the molten cordierite generating more liquid at the higher sintering temperatures.

Generally, however, the nucleating agent lowers the present sintering temperature. For example, when titanium dioxide or titanium isopropoxide are used as nucleating agents in the present invention, the present sintering temperature ranges from about 1450° C. to about 1490° C., and temperatures higher than about 1490° C. generate so much liquid as to slump the compact or body. On the other hand, when lithium fluoride is the nucleating agent, the present sintering temperature ranges from about 1290° C. to about 1340° C., and temperatures higher than about 1340° C. generate so much liquid as to slump the compact or body. When magnesium fluoride is the nucleating agent, the present sintering temperature ranges from about 1390° C. to about 1490° C., and temperatures higher than about 1490° C. generate so much liquid as to slump the compact or body. Mixtures of nucleating agents can be used to attain a desired sintering temperature. During sintering, the liquid formed is comprised primarily of molten cordierite with a minor amount of dissolved zircon and nucleating agent.

The present sintering is carried out to produce a sintered body having a density greater than about 85% of its theoretical density. Sintering time is determinable empirically. Generally, a sintering time of about 30 minutes to ten hours is satisfactory.

The sintered body, which is comprised of polycrystalline zircon phase and a glassy cordierite phase, is nucleation-annealed to nucleate the glassy cordierite phase sufficiently to allow its crystallization to produce the present polycrystalline body. Specifically, the sintered body is annealed at a temperature ranging from about 600° C. to about 800° C., preferably from about 650° C. to about 750° C., and most preferably, it is annealed at about 700° C. At a temperature below about 600° C., the rate of nucleation is too slow to be useful whereas a temperature higher than about 800° C. is not operable in the present process.

Nucleation-annealing time is determinable empirically by standard techniques such as, for example, by observations of the degree to which the final product is crystallized. Generally, a nucleation-annealing time period of about two hours is satisfactory at about 700° C.

The nucleation-annealed sintered body is then crystallization-annealed to crystallize the nucleated glassy cordierite phase to produce the present polycrystalline body. Specifically, the nucleation-annealed sintered body is crystallization-annealed at a temperature ranging from about 1200° C. to a temperature at which the body remains totally solid. More specifically, the present crystallization-annealing is carried out at a temperature ranging from about 1200° C. up to a temperature at which any liquid forms in the body, i.e. from about 1200° C. to a temperature below the liquid-forming temperature, and such maximum crystallization-annealing temperature depends on the particular composition of the body being annealed. For example, when the nucleating agent has no effect on the temperature at which liquid forms in the present system, the crystallization-annealing temperature ranges from about 1200° C. to a temperature below the melting point of pure cordierite, i.e. below about 1460° C. However, when the nucleating agent does have an effect on the temperature at which liquid forms in the present system, the crystallization-annealing temperature ranges from about 1200° C. to that temperature below the liquid-forming temperature of that particular composition. For example, when $TiO_2$ is used as the nucleating agent in the present invention, the maximum crystallization-annealing temperature would be below about 1450° C. When lithium fluoride is used as the nucleating agent in the present invention, the maximum crystallization-annealing temperature would be below about 1290° C. When magnesium fluoride is the nucleating agent, the maximum crystallization-annealing temperature would be below about 1390° C. At a temperature lower than about 1200° C. the rate of such crystallization is too slow to be useful.

Crystallization-annealing time is determinable empirically by standard techniques such as, for example, by observations of the degree to which the final product is crystallized. Generally, a crystallization-annealing time of about two hours is satisfactory.

The present firing, i.e. sintering, nucleation-annealing and crystallization-annealing, can be carried out in a vacuum or in an atmosphere, preferably at ambient pressure, which has no significantly deleterious effect on the compact or body. By ambient pressure herein it is meant atmospheric or about atmospheric pressure. Representative of a useful firing atmosphere is air, hydrogen, wet hydrogen, nitrogen, argon and mixtures thereof.

In one preferred embodiment, the present sintering, nucleation-annealing and crystallization-annealing are carried out in a single run using the same atmosphere or vacuum throughout the run.

The present polycrystalline body is a pressureless sintered body. By pressureless sintering herein it is meant the densification or consolidation of the compact or shaped body without the application of mechanical pressure into a body having a density greater than about 85% of the theoretical density of the body.

The present polycrystalline body is comprised of zircon and cordierite phases, and more specifically, it has a phase composition comprised of polycrystalline zircon in an amount ranging from about 45% by weight to about 95% by weight of the total weight of the body and polycrystalline cordierite in an amount ranging from about 5% by weight to about 55% by weight of the total weight of the body.

The present polycrystalline body has a density greater than about 85% of its theoretical density. Preferably, the present polycrystalline body has a density greater than about 90%, and more preferably greater than about 95%, of the theoretical density of said body.

In a preferred embodiment, the present polycrystalline body has a phase composition comprised of polycrystalline zircon ranging from about 50% by weight to about 60% by weight of the total weight of the body, and polycrystalline cordierite ranging from about 40% by weight to about 50% by weight of the total weight of the body, and has a thermal expansion coefficient within about 10% of that of silicon at 300° K.

In a more preferred embodiment, the present polycrystalline body has a phase composition comprised of about 53% by weight of polycrystalline zircon and about 47% by weight of polycrystalline cordierite, and has a thermal expansion coefficient which is the same as or which is within about 5% of that of silicon at 300° K.

The present polycrystalline body can contain a glassy phase in an amount of less than about 2% by volume, and preferably less than about 1% by volume, of the total volume of said body. Even more preferably, the present polycrystalline body contains only a detectable amount of glassy phase. Therefore, glassy phase in the present polycrystalline body can range from a detectable amount up to about 2% by volume of the total volume of the body. The amount of glassy phase present in the present polycrystalline body depends largely on the impurities in the starting materials.

The present polycrystalline body may or may not contain a minor amount of a phase comprised of the nucleating agent, and the presence of such phase depends largely on the particular nucleating agent used, i.e. the extent to which the nucleating agent vaporizes away, if at all, during the present process. Specifically, the present polycrystalline body contains a phase of nucleating agent ranging from none to about 5% by weight of the total weight of the body. In one embodiment, the present polycrystalline body contains a phase of nucleating agent ranging from about 0.5% by weight to about 5% by weight of the body. In another embodiment, the present polycrystalline body contains a phase of nucleating agent ranging from about 0.6% by weight to about 4% by weight of the body. In yet another embodiment, the present polycrystalline body contains a phase of nucleating agent of from about 0.75% by weight to about 3.25% by weight of the body. For example, in the present process the fluoride nucleating agents vaporize significantly and are not detectable as a phase in the present polycrystalline body using standard techniques such as, for example, X-ray diffraction analysis or by optically examining the microstructure. On the other hand, a nucleating agent such as titanium dioxide does not appear to vaporize away to any significant extent in the present process and does leave a $TiO_2$ phase in the final product which corresponds, or substantially corresponds, to the amount of $TiO_2$ present before sintering. The $TiO_2$ phase is barely detectable by X-ray diffraction analysis and can range from about 0.5% by weight to about 5% by weight of the total weight of the final product, i.e. of the present polycrystalline body. Any nucleating agent present in the present polycrystalline body should have no significant deleterious effect on the body.

In the present polycrystalline body, the phases are distributed uniformly, substantially uniformly or at least significantly uniformly. Also, the present polycrystalline body has a uniform, substantially uniform or at least a significantly uniform microstructure.

The cordierite phase in the present polycrystalline body can be discontinuous or continuous. Specifically, in the present polycrystalline body, when the cordierite phase ranges from about 5% by weight to about 10% by weight of the body, it is discontinuous. As the cordierite phase increases in amount from 10% by weight up to about 15% by weight of the body, it exhibits some continuity, and at about 15% by weight of the body, it is likely to be continuous and interconnecting. The cordierite phase ranging in amount from in excess of 20% by weight to about 55% by weight of the body is continuous and interconnecting and envelops small islands of the zircon phase.

The present polycrystalline body has a number of uses, but because of its relatively low thermal expansion coefficient, it is particularly useful as a substrate material, especially as a supporting substrate for semiconductors in information processing equipment such as computers. Specifically, the present polycrystalline body has a thermal expansion coefficient of less than $4.2 \times 10^{-6}/°$ K. at 300° K., and its thermal expansion coefficient decreases as its content of cordierite increases. This is illustrated by the calculated graph of FIG. 2 which shows that the present polycrystalline body containing about 5% by weight cordierite would have a thermal expansion coefficient of about $4.1 \times 10^{-6}/°$ K. at 300° K., and the present body containing about 50% by weight cordierite would have a thermal expansion coefficient of roughly about $2.6 \times 10^{-6}/°$ K. at 300° K. However, the measured thermal expansion coefficient of the present body containing about 48% by weight cordierite was $2.4 \pm 0.1 \times 10^{-6}/°$ K. at 300° K.

The present invention makes it possible to fabricate simple, complex and/or hollow shaped polycrystalline ceramic articles directly. Specifically, the present sintered body can be produced in the form of a useful complex shaped article without machining such as a thin walled hollow tube, a long rod, a spherical body, a tape or a hollow shaped article. The dimensions of the sintered body differ from those of the unsintered body, by the extent of shrinkage, i.e. densification, which occurs during sintering.

The present ceramic body has a number of uses. In the form of a thin flat piece of uniform thickness, or having no significant difference in its thickness, i.e. in the form of a substrate or tape, it is especially useful as packaging for integrated circuits and as a supporting substrate for an integrated circuit, particularly as a substrate for a semiconducting Si chip for use in computers. The present ceramic body also is useful as a sheath for temperature sensors up to temperatures of about 1200° C.

The invention is further illustrated by the following examples wherein the procedure was as follows unless otherwise stated:

In Examples 1–8, all firing, i.e., sintering, nucleation-annealing and crystallization-annealing, was carried out in air at ambient pressure.

In Examples 9–14, all firing, i.e., sintering, nucleation-annealing and crystallization-annealing, was carried out in oxygen at ambient pressure.

All firing of the compact or body was carried out in a molybdenum disilicide resistance furnace.

At the end of each run, the power was switched off and the body was furnace-cooled to room temperature.

Density of the final fired body was determined by the Archimedes method.

Phase composition of the final product was determined by standard techniques including optical microscopy and/or X-ray diffraction analysis.

Thermal expansion coefficient at 300° K. was measured in a calibrated alumina dilatometer.

EXAMPLE 1

The starting powder mixture was prepared from high-purity (greater than about 99% pure) powders of aluminum oxide, silicon oxide, zircon, magnesium oxide and $TiO_2$. $TiO_2$ was used as a nucleating agent. Specifically, 4.2% by weight of $Al_2O_3$ with an average particle size of about $0.15\mu$, 6.1% by weight of $SiO_2$ with an average particle size of about $1.0\mu$, 1.6% by weight of MgO with an average particle size of about $0.5\mu$, 87.2% by weight $ZrSiO_4$ with an average particle size of about $1\mu$, and 0.9% by weight of $TiO_2$ with an average particle size of about $0.1\mu$ were ball-milled at room temperature using alumina media in acetone with a polyacrylic acid added as a dispersant. After milling for 3 hours, the liquid was removed by drying in air at about 40° C. The resulting powder mixture was substantially uniform and had an average particle size of about $0.5\mu$.

The powder mixture, which had the starting composition shown in Table I, was pressed into pellets at ambient temperature under a pressure of about 20,000 psi. Each pellet was in the form of a disc of substantially the same size of about ½ inch in diameter and about ⅛ inch in thickness.

One disc was sintered at 1490° C. for two hours. The temperature was then lowered to 700° C. where it was held for 2 hours to nucleate the glassy cordierite phase. The temperature was then raised to 1300° C. where it was held for 2 hours to crystallize the cordierite phase. The disc was then furnace cooled to ambient temperature. All firing, i.e. sintering, nucleation- and crystallization-annealing was carried out in air at ambient pressure, and the fired disc was furnace cooled in the same atmosphere.

The final fired body, i.e. the present polycrystalline body had a density of 90.3% of its theoretical density. It was comprised of about 87.2% by weight zircon phase, about 11.9% by weight of cordierite phase and about 0.9% by weight of $TiO_2$ phase.

The disc had a measured thermal expansion coefficient at 300° K. of $4.0 \pm 0.1 \times 10^{-6}/°$ K.

This disc would be useful as a supporting substrate for a silicon chip for use in ceramic packaging for use in computers.

This example is illustrated in Table I.

Examples 2-14 of Table I were carried out in substantially the same manner as Example 1 except as noted in Table I and except as noted herein. The starting powders were used to produce a powder mixture of the given formulation, i.e. starting composition, shown in Table I. In examples 2, 3, 5, 7, 8, 11 and 14, zircon powder was used as the source of $ZrO_2$ and in the remaining examples $ZrO_2$ powder was used. The resulting powder mixture in each example had an average particle size of about $0.5\mu$. Also, in Example 4 no nucleating agent was used, in Example 7 lithium fluoride was used instead of titanium dioxide; and in Example 8 magnesium fluoride was used instead of titanium dioxide. The lithium fluoride and magnesium fluoride had an average particle size of about 1.0 micron and were greater than 99% pure.

In Examples 13 and 14, the compacts were prefired in air at ambient pressure at a temperature of 1200° C. for 16 hours, the temperature was then raised to 1490° C. and the firing schedule was then as shown in Table I.

with Examples 1, 9 and 10, it is known that the final fired bodies of Examples 2 and 6-8 would have a thermal expansion coefficient at 300° C. of about $4.0\times10^{-6}/°$ K. at 300° K., and that the final fired bodies of Examples 11-14 would have a thermal expansion coefficient at 300° K. between $2.4\times10^{-6}/°$ K. and $2.8\times10^{-6}/°$ K.

Example 3 illustrates that a nucleation temperature of 1100° C. is not operable to produce the present polycrystalline body.

In Example 4, no nucleating agent was used, and the present polycrystalline body was not produced.

Example 5 illustrates the importance of the present nucleation-annealing. Specifically, in Example 5, the sintered body was not nucleation-annealed and the final fired body did not contain the present crystalline cordierite phase.

A polished cross-section of the final fired body produced in Example 11 is illustrated in FIG. 1 which shows that it was comprised of zircon (lighter phase), cordierite (darker colored phase) and a minor amount of $TiO_2$ (brightest colored particles), and that it had a continuous interconnecting phase of cordierite enveloping islands of the zircon phase. The two black spots in

TABLE I

| Example | Starting Composition | | | | | | | | Sintering | | Nucleation Annealing | |
|---|---|---|---|---|---|---|---|---|---|---|---|---|
| | $ZrO_2$ wt % | $SiO_2$ wt % | $Al_2O_3$ wt % | MgO wt % | $TiO_2$ wt % | LiF wt % | $MgF_2$ wt % | $ZrO_2$ Source | Temp. (°C.) | Time (hr) | Temp. (°C.) | Time (hr) |
| 1 | 58.6 | 34.7 | 4.2 | 1.6 | 0.9 | — | — | $ZrSiO_4$ | 1490 | 2 | 700 | 2 |
| 2 | 58.6 | 34.7 | 4.2 | 1.6 | 0.9 | — | — | $ZrSiO_4$ | 1490 | 2 | 700 | 2 |
| 3 | 58.6 | 34.7 | 4.2 | 1.6 | 0.9 | — | — | $ZrSiO_4$ | 1490 | 2 | 700 | 2 |
| 4 | 59.1 | 35.1 | 4.2 | 1.6 | — | — | — | $ZrO_2$ | 1490 | 2 | 700 | 2 |
| 5 | 58.6 | 34.7 | 4.2 | 1.6 | 0.9 | — | — | $ZrSiO_4$ | 1490 | 2 | | |
| 6 | 58.6 | 34.7 | 4.2 | 1.6 | 0.9 | — | — | $ZrO_2$ | 1490 | 2 | 700 | 2 |
| 7 | 58.8 | 34.9 | 4.2 | 1.6 | — | 0.5 | — | $ZrSiO_4$ | 1290 | 2 | 700 | 2 |
| 8 | 58.8 | 34.9 | 4.2 | 1.6 | — | — | 0.5 | $ZrSiO_4$ | 1390 | 2 | 700 | 2 |
| 9 | 39.3 | 38.9 | 13.6 | 5.3 | 2.9 | — | — | $ZrO_2$ | 1490 | 2 | 700 | 2 |
| 10 | 32.3 | 40.4 | 16.8 | 6.7 | 3.8 | — | — | $ZrO_2$ | 1490 | 2 | 700 | 2 |
| 11 | 34.3 | 40.1 | 15.9 | 6.3 | 3.4 | — | — | $ZrSiO_4$ | 1490 | 0.5 | 700 | 2 |
| 12 | 34.3 | 40.1 | 15.9 | 6.3 | 3.4 | — | — | $ZrO_2$ | 1490 | 0.5 | 700 | 2 |
| 13 | 34.3 | 40.1 | 15.9 | 6.3 | 3.4 | — | — | $ZrO_2$ | *1490 | 0.5 | 700 | 2 |
| 14 | 34.3 | 40.1 | 15.9 | 6.3 | 3.4 | — | — | $ZrSiO_4$ | *1490 | 0.5 | 700 | 2 |

| Example | Crystallization Annealing | | Firing Atmosphere | Properties of Final Fired Body | | | | Thermal Expansion Coefficient @ 300° K. |
|---|---|---|---|---|---|---|---|---|
| | Temp. (°C.) | Time (hr) | | Zircon wt % | Cordierite wt % | Other wt % | Density % theo. | |
| 1 | 1300 | 2 | air | ~87.2 | ~11.9 | ~0.9($TiO_2$) | 90.3 | $4.0 \times 10^{-6}/°K.$ |
| 2 | 1200 | 2 | air | ~87.2 | ~11.9 | ~0.9($TiO_2$) | 88.5 | — |
| 3 | 1100 | 2 | air | ~87.2 | ~11.9 | ~11.9(glass) | — | — |
| 4 | 1300 | 2 | air | ~87.2 | ~11.9 | ~11.9(glass) | — | — |
| 5 | 1300 | 2 | air | ~87.2 | — | ~12(glass) | — | — |
| 6 | 1300 | 2 | air | ~87.2 | ~11.9 | ~0.9($TiO_2$) | 93.2 | — |
| 7 | 1200 | 2 | air | ~88.0 | ~12.0 | — | 87.4 | — |
| 8 | 1200 | 2 | air | ~88.0 | ~12.0 | — | 85.0 | — |
| 9 | 1300 | 2 | $O_2$ | ~58.3 | ~38.9 | ~2.8($TiO_2$) | 88.0 | $2.8 \times 10^{-6}/°K.$ |
| 10 | 1300 | 2 | $O_2$ | ~48.2 | ~48.2 | ~3.7($TiO_2$) | 92.7 | $2.4 \times 10^{-6}/°K.$ |
| 11 | 1300 | 2 | $O_2$ | ~51.3 | ~45.5 | ~3.3($TiO_2$) | 90.8 | — |
| 12 | 1300 | 2 | $O_2$ | ~51.3 | ~45.5 | ~3.3($TiO_2$) | 85.3 | — |
| 13 | 1300 | 2 | $O_2$ | ~51.3 | ~45.5 | ~3.3($TiO_2$) | 93.2 | — |
| 14 | 1300 | 2 | $O_2$ | ~51.3 | ~45.5 | ~3.3($TiO_2$) | 91.5 | — |

*Prefired in air at 1200° C. for 16 hours

Examples 1, 2 and 6-14 of Table I illustrate the present invention. All of the final fired bodies of Examples 1, 2 and 6-14, i.e. the present polycrystalline bodies, would be useful as a substrate for a semiconductor such as a silicon chip. In Example 9, the final fired body had a measured thermal expansion coefficient of $2.8\pm0.1\times10^{-6}/°$ K. at 300° K., and in Example 10 it had a measured thermal expansion coefficient of $2.4\pm0.1\times10^{-6}/°$ K. at 300° K. Based on other work, FIG. 2 and a comparison of Examples 2, 6-8 and 11-14

FIG. 1 are voids, about 15 microns in diameter, and they are typical of the voids that are left in this type of liquid phase sintering. These voids have no significant deleterious effect on the present polycrystalline body.

EXAMPLE 15

Two pellets, i.e. green discs, were prepared according to the present invention according to the disclosure of Example 1. Each disc had the same composition as disclosed for Example 1.

Tungsten ink in the form of an X was brushed on one surface on one of the discs. A sandwich of the two discs with the deposited tungsten ink between them was formed and sintered at 1490° C. for one hour. The temperature was then lowered to 700° C. where it was held for 2 hours to nucleate the glassy cordierite phase. The temperature was then raised to 1300° C. where it was held for 2 hours to crystallize the cordierite phase. The resulting fired body was then furnace cooled to ambient temperature. All firing, i.e. sintering, nucleation- and crystallization-annealing, was carried out in wet hydrogen having a dew point of 25° C. at ambient pressure, and the fired body was cooled in the same atmosphere.

The resulting product, i.e. body, had a density greater than 85% of its theoretical density.

The low oxygen partial pressure provided by the wet hydrogen atmosphere which was necessary to prevent the oxidation of the tungsten, resulted in some volatilization of $SiO_2$ from the surface of the ceramic. However, this resulted only in the slight depletion of cordierite only on the surface as indicated by X-ray diffraction was and not considered significant.

In the resulting fired ceramic assembly, the tungsten interconnects were sintered to sufficient density to provide a continuous electrical pathway through the assembly. The low thermal expansion coefficient of the ceramic in conjunction with the electrical continuity of the tungsten illustrate the usefulness of the present polycrystalline body in ceramic packaging of semiconductors.

In copending U.S. Ser. No. 616,748 entitled "Mullite-Cordierite Composite Ceramic" filed on June 4, 1984 in the name of James David Hodge and assigned to the assignee hereof and incorporated herein by reference there is disclosed a method for producing a polycrystalline body comprised of from about 50% by weight to about 95% by weight of mullite and from about 5% by weight to about 50% by weight of cordierite, said body having a porosity of less than about 10% by volume.

What is claimed is:

1. A process for producing a polycrystalline body having a thermal expansion coefficient of less than $4.2 \times 10^{-6}$° K. at 300° K. consisting essentially of from about 45% by weight to about 95% by weight of polycrystalline zircon phase, from about 5% by weight to about 55% by weight of polycrystalline cordierite phase, up to about 5% by weight of a phase of a nucleating agent, and less than about 2% by volume of a glassy phase which consists essentially of forming a mixture consisting essentially of zircon and/or $ZrO_2$, $Al_2O_3$, MgO and $SiO_2$ and a nucleating agent, said zircon and-/or $ZrO_2$, $Al_2O_3$, MgO and $SiO_2$ being used in amounts required to produce said polycrystalline zircon phase and said polycrystalline cordierite phase of said polycrystalline body, shaping said mixture into a compact, sintering said compact at a temperature ranging from about 1290° C. to about 1550° C. at which sufficient liquid phase is generated to liquid phase sinter the compact and produce a densified body having a density greater than about 85% of the theoretical density of said body, said sintering temperature having no significant deleterious effect on said compact or body, said sintered body containing said zircon phase and a glassy phase of said cordierite, nucleation-annealing said sintered body at a temperature ranging from about 600° C. to about 800° C. to nucleate said glassy cordierite phase, crystallization-annealing the resulting nucleated body at a temperature ranging from about 1200° C. to below the temperature at which liquid phase forms in said body to produce said polycrystalline body, said nucleating agent being an agent for nucleating said glassy cordierite phase, said nucleating agent being used in an amount sufficient to nucleate said glassy cordiertie phase to produce said polycrystalline body, said sintering, said nucleation-annealing and said crystallization-annealing being carried out in an atmosphere or vacuum which has no significant deleterious effect on said compact or body.

2. The process according to claim 1 wherein said nucleation-annealing temperature ranges from about 650° C. to about 750° C.

3. The process according to claim 1 wherein said atmosphere is selected from the group consisting of air, hydrogen, wet hydrogen, nitrogen, argon and mixtures thereof.

4. The process according to claim 1 wherein said compact is in the form of a tape.

5. The process according to claim 1 wherein said polycrystalline body ranges from about 50% by weight to about 60% by weight of said zircon phase and from about 40% by weight to about 50% by weight of said cordierite phase.

6. The process according to claim 1 wherein said polycrystalline body contains about 47% by weight of said zircon phase and about 53% by weight of said cordierite phase.

7. A process for producing a polycrystalline body having a thermal expansion coefficient of less than $4.2 \times 10^{-6}$° K. to 300 ° K. consisting essentially of from about 45% by weight to about 95% by weight of polycrystalline zircon phase, from about 5% by weight to about 55% by weight of polycrystalline cordierite phase, up to about 5% by weight of a phase of a nucleating agent, and less than about 2% by volume of a glassy phase which consists essentially of forming a mixture consisting essentially of zircon and/or $ZrO_2$, $Al_2O_3$, MgO and $SiO_2$ and a nucleating agent, said zircon and/or $ZrO_2$, $Al_2O_3$, MgO and $SiO_2$ being used in amounts required to produce said polycrystalline zircon phase and said polycrystalline cordierite phase of said polycrystalline body, said nucleating agent being selected from the group consisting of titanium dioxide, titanium isopropoxide, lithium fluoride, magnesium fluoride and mixtures thereof, shaping said mixture into a compact, sintering said compact at a temperature ranging from about 1290° C. to about 1490° C. at which sufficient liquid phase is generated to liquid phase sinter the compact and produce a densified body having a density greater than about 85% of the theoretical density of said body, said sintering temperature having no significant deleterious effect on said body, said sintered body containing said zircon phase and a glassy phase of said cordierite, nucleation-annealing said sintered body at a temperature ranging from about 600° C. to about 800° C. to nucleate said glassy cordierite phase, crystallization-annealing the resulting nucleated body at a temperature ranging from about 1200° C. to below the temperature at which liquid phase forms in said body to produce said polycrystalline body, said nucleating agent being used in an amount sufficient to nucleate said glassy cordierite phase to produce said polycrystalline body, said sintering, said nucleation-annealing and said cystallization-annealing being carried out in an atmosphere or vacuum which has no significant deleterious effect on said compact or body.

8. The process according to claim 7 wherein said nucleation-annealing temperature ranges from about 650° C. to about 750° C.

9. The process according to claim 7 wherein said atmosphere is selected from the group consisting of air, hydrogen, wet hydrogen, nitrogen, argon and mixtures thereof.

10. The process according to claim 7 wherein said compact is in the form of a tape.

11. The process according to claim 7 wherein said polycrystalline body ranges from about 50% by weight to about 60% by weight of said zircon phase and from about 40% by weight to about 50% by weight of said cordierite phase.

12. The process according to claim 7 wherein said polycrystalline body contains about 47% by weight of said zircon phase and about 53% by weight of said cordierite phase.

13. A polycrystalline body consisting essentially of polycrystalline zircon phase in an amount ranging from about 45% by weight to about 95% by weight of the total weight of the body and polycrystalline cordierite phase in an amount ranging from about 5% by weight to about 55% by weight of the total weight of the body, said body containing a glassy phase in an amount of less than about 2% by volume of said body, said body having a thermal expansion cofficient of less than $4.2 \times 10^{-6}$° K. at at 300° K. and a density greater than about 85% of the theoretical density of said body.

14. The polycrystalline body of claim 13 in the form of a tape.

15. A polycrystalline body consisting essentially of polycrystalline zircon ranging from about 50% by weight to about 60% by weight of the total weight of the body, and polycrystalline cordiertie phase ranging from about 40% by weight to about 50% by weight of the total weight of the body, said body containing a glassy phase in an amount of less than about 2% by volume of said body, said body having a density greater than about 85% of the theoretical density of said body.

16. The polycrystalline body of claim 15 in the form of a tape.

17. A polycrystalline body consisting essentially of polycrystalline zircon phase in an amount ranging from about 45% by weight to about 95% by weight of the total weight of the body, polycrystalline cordierite phase in an amount ranging from about 5% by weight to about 55% by weight of the total weight of the body, a phase of a nucleating agent ranging up to about 5% by weight of said body, and a glassy phase of less than about 2% by volume of the total volume of said body, said body having a theoretical density greater than 85% of the theoretical density of said body.

18. The polycrystalline body of claim 17 in the form of a tape.

19. The polycrystalline body of claim 17 wherein said phase of nucleating agent is $TiO_2$.

20. A polycrystalline body consisting essentially of polycrystalline zircon phase in an amount ranging from about 45% by weight to about 95% by weight of the total weight of the body and polycrystalline cordierite phase in an amount ranging from about 5% by weight to about 55% by weight of the total weight of the body, said zircon phase consisting essentially of about 67.2 weight % $ZrO_2$, balance $SiO_2$, said cordierite phase consisting essentially of from about 13.7 weight % to about 16.5 weight % MgO, from about 28.4 weight % to about 34.9 weight % $Al_2O_3$ and from about 51.4 to about 55.2 weight % $SiO_2$, said body containing a glassy phase in an amount of less than about 2% by volume of said body, said body having a thermal expansion coefficient of less than $4.2 \times 10^{-6}$° K. at 300° K. and a density greater than 85% of the theoretical density of said body.

21. The polycrystalline body according to claim 20 wherein said body contains $TiO_2$ phase in an amount ranging from an amount detectable by X-xay diffraction analysis to about 5% by weight of said body.

22. A polycrystalline body consisting essentially of polycrystalline zircon phase in an amount ranging from about 50% by weight to about 60% by weight of the total weight of the body, polycrystalline cordierite phase in an amount ranging from about 40% by weight to about 50% by weight of the total weight of the body, a phase of a nucleating agent ranging up to about 5% by weight of said body, and a glassy phase of less than about 2% by volume of the total volume of said body said body having a density greater than about 85% of the theretical density of said body.

23. The polycrystalline body according to claim 22 wherein said phase of said nucleating agent is $TiO_2$.

24. A polycrystalline body consisting essentially of polycrystalline zircon phase in an amount of about 53% by weight of the total weight of the body, polycrystalline cordierite phase in an amount of about 47% by weight of the total weight of the body, a phase of a nucleating agent ranging up to about 5% by weight of said body, and a glassy phase of less than about 2% by volume of the total volume of said body, said body having a density greater than about 85% of the theoretical density of said body.

25. The polycrystalline body according to claim 24 wherein said phase of said nucleating agent is $TiO_2$.

* * * * *